INVENTOR
JOHN HAYS HAMMOND, JR.
BY
ATTORNEY

Oct. 3, 1939.    J. H. HAMMOND, JR    2,174,785
ALTITUDE DETERMINING SYSTEM FOR AIRPLANES
Filed April 29, 1937    2 Sheets-Sheet 2
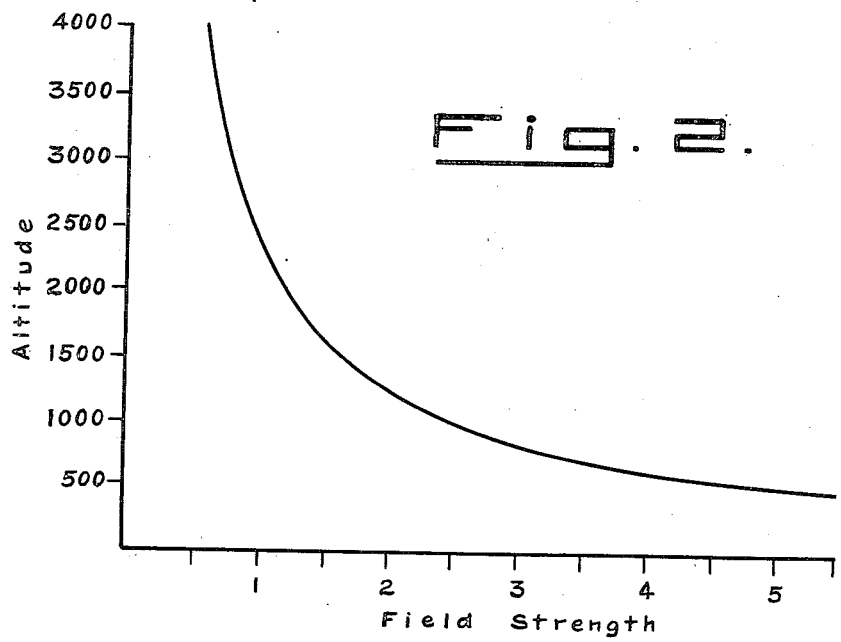
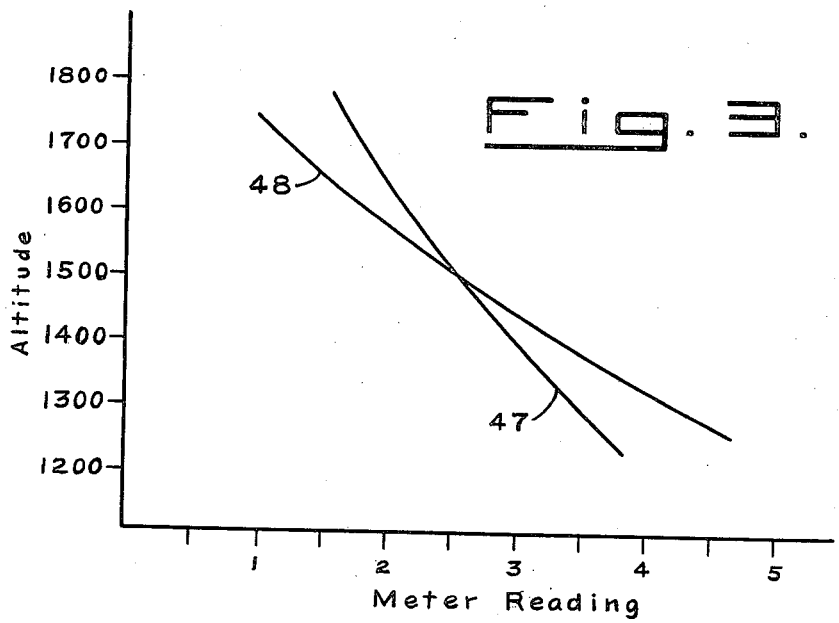
INVENTOR
JOHN HAYS HAMMOND, JR.
BY
ATTORNEY Patented Oct. 3, 1939

2,174,785

UNITED STATES PATENT OFFICE 2,174,785

ALTITUDE DETERMINING SYSTEM FOR AIRPLANES

John Hays Hammond, Jr., Gloucester, Mass.

Application April 29, 1937, Serial No. 139,705

3 Claims. (Cl. 250—1)

This invention relates to means for guiding moving vehicles and more specifically to a system for guiding airplanes and the like over difficult and dangerous terrain such as through mountain passes or over steep hills.

An object of this invention is to provide a novel and improved means for continuously apprising the navigator of an airplane of his distance above the ground.

Another object is to provide a system of the above type to be used with any type of radio trail which produces a continuous or discontinuous electro-magnetic radiant-energy field above the trail of constant and predetermined intensity, such for example as that shown in U. S. Patent No. 1,917,114 issued July 4, 1933 to John Hays Hammond, Jr. and E. F. W. Alexanderson.

Another object is to provide a sensitive and convenient system of the above type.

Other objects and advantages will be apparent as the invention is more fully disclosed.

The invention provides a radio receiver adapted to receive the radiant energy signals designating the trail and having an expansion network associated therewith which expands the volume range of the reproduced signal so as to obtain a more sensitive response. In one embodiment the expansion network includes a non-linear amplifier having variable gain characteristics which are proportional to the input energy. Small changes in field strength corresponding to minor variations in altitude are thus caused to produce an accentuated response at the indicating device. The invention accordingly provides a sensitive indicator which is responsive to minor changes in altitude and thereby enables the pilot to maintain a substantially constant, predetermined altitude while following the radio trail.

Although the novel features which are believed to be characteristic of this invention will be particularly pointed out in the claims appended hereto, the invention itself, as to its objects and advantages, the mode of its operation and the manner of its organization may be better understood by referring to the following description, taken in connection with the accompanying drawings forming a part thereof, in which Fig. 1 illustrates schematically a circuit constructed in accordance with this invention;

Fig. 2 is a curve depicting the variation of field strength with altitude; and

Fig. 3 is a series of curves showing the use of the invention in connection with a radio trail.

Figure 1:
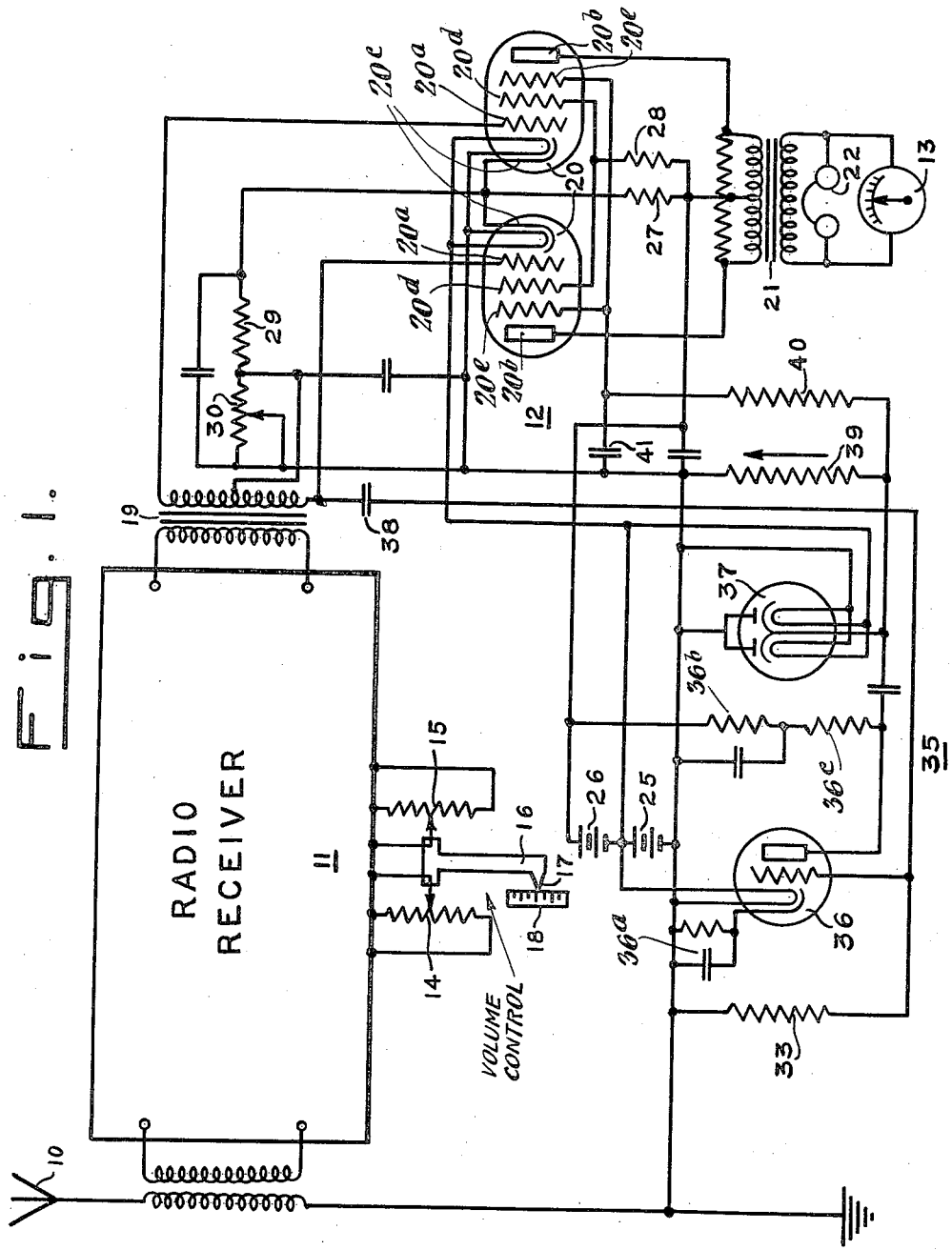

In the following description and in the claims parts will be identified by specific names for convenience, but they are intended to be as generic in their application to similar parts as the art will permit.

Referring to the accompanying drawings and more specifically to Fig. 1, one form of the invention is shown which comprises an antenna 10 for receiving radiant energy, a radio receiver 11, an expander 12, to be described, and an indicating device 13 for indicating the strength of the received signal.

The radio receiver 11 may be of any well known and standard construction, such as a superheterodyne receiver, and is adapted to receive and rectify radio frequency energy to produce audio frequency signals in the output circuit thereof. The amplification of this receiver may be controlled manually in any well known manner, such for example as by means of two volume control potentiometers 14 and 15 which may be operated individually or in unison as desired. As shown in Fig. 1 they are operated in unison by means of an arm 16 which is provided with a pointer 17 for indicating on a scale 18 the adjustments of the potentiometers.

The output circuit of the radio receiver 11 is connected through a transformer 19 to the input circuit of the expander 12. In the embodiment shown, the expander 12 comprises a pair of triple-grid tubes 20 connected as a push-pull amplifier with the secondary of the transformer 19 connected to the first or signal grids 20a. The output circuit of the expander 12 is connected through a transformer 21 to the indicating device 13 which may comprise any suitable type of meter for indicating the output energy. A pair of head-phones 22 may be connected across the indicator 13 for purposes of adjustment or for obtaining an audible indication.

In the form shown, the anodes 20b of the tubes 20 are connected in push-pull relationship to the primary of the transformer 21. The cathodes 20c are connected to ground through self-biasing resistor 29 and potentiometer 30 by which the normal operating grid bias of the tubes may be controlled. The filaments of the tubes 20 are supplied by a suitable source of heating current, such as a battery 25. Plate potential is derived from a suitable source such as a battery 26, the positive terminal of which is connected to the mid-point of the primary of the transformer 21 and through a bleeder resistor 27 to the cathodes 20c and thence through the self-biasing resistor 29 and the potentiometer 30 to ground. The positive terminal of the battery 26 is also connected through a biasing resistor 28 to the second or screen grids 20d of the tubes 20.

The biasing potential on the third grids 20e of the tubes 20 is controlled by a control circuit 35. In the form shown, this control circuit comprises an amplifier tube 36 and a rectifier 37 connected in the output circuit thereof. The input circuit of the amplifier tube 36 is connected through a condenser 38 to one side of the secondary of the transformer 19 whereby a portion of the energy from said secondary is applied to the amplifier tube 36. A coupling resistor 33 is connected across the input circuit of the tube 36 and a suitable self-biasing network 36a may be connected to the cathode thereof. The filament of the tube 36 is supplied from the battery 25 and plate potential is supplied from the battery 26 through resistors 36b and 36c. The rectifier 37 is connected in the output circuit of the amplifier 36 across a resistor 39 so that current is caused to flow through the resistor 39 in the direction of the arrow. The positive end of this resistor is connected through a resistor 40 to the third grids 20e of the tubes 20. A timing condenser 41, connected between the third grids 20e and ground, controls rate of change of the grid biasing potential in the manner to be described.

It is to be understood that the power supply for the tubes above mentioned may be taken from any desired source such as a power line. Certain batteries have been shown for convenience only. The circuit may also include various control elements such as by-pass condensers, coupling and filter circuits and the like which are well known in the art. Only so much thereof has been disclosed herein as is necessary to an understanding of the present invention.

This device is adapted to operate with a standard radio trail which may be of any well known type comprising a continuous or discontinuous electromagnetic radiant energy field above the trail having a fixed and predetermined field strength varying in a definite manner with altitude, such, for example, as a trail of the type disclosed in the Hammond et al. Patent 1,917,114 above mentioned. The relationship between the altitude and the field strength is shown, for example, in Fig. 2 in which it will be noted that the field strength decreases as a predetermined function of the altitude. It is evident, therefore, that an accurate determination of the field strength will indicate the altitude above the radio trail.

The airplane may be maintained directly above the trail by the use of a horizontal direction finder of the type disclosed in the patent to Eaton, 1,926,616. Assuming that the plane is thus being flown directly above the trail, radiant energy will be received by the antenna 10 and will be rectified and amplified in radio receiver 11. The amplification in the receiver 11 may be controlled manually by means of the two potentiometers 14 and 15 which may be set in accordance with the desired altitude in the manner to be described. The low frequency output energy from the radio receiver 11 passes through the transformer 19 to the input circuit of the expander 12 where it is further amplified and made available for the indicator 13 or for the head phones 22.

The amplification of the expander 12 is automatically controlled by means of the control circuit 35 so that the gain ratio of the amplifier is made proportional to the intensity of the input signal. For this purpose a portion of the energy from the output circuit of the radio receiver passes through the coupling condenser 38 to the input circuit of the amplifier tube 36 which operates as a standard amplifier and produces a current in the output circuit thereof which is impressed upon the rectifier 37 and rectified thereby to cause a unidirectional current to flow through the resistor 39 in the direction of the arrow. This current varies in accordance with the envelope of the input energy, that is, the current through the resistor 39 and consequently the potential drop across that resistor, is directly proportional to the average input energy. The condenser 38 and the resistor 33 constitute a filter coupler which discriminates against the low frequency tones so that the control is made responsive to the higher frequency components of the signal. The positive potential developed across the resistor 39 is impressed through the resistor 40 on the third grids 20e of the tubes 20 so as to oppose the normal negative bias of these grids. The potentiometer 30 may be so adjusted that in the absence of tonal signal, a large negative bias is impressed upon the third grids 20e. When signals are impressed upon the rectifier 37, current flows through the resistor 39, as above mentioned, thereby producing a potential drop which opposes the negative bias of said grids.

A decrease of negative bias on the third grids increases the ability of the first grids 20a to control the plate current, thereby increasing the first grid-to-plate conductance and increasing the gain ratio of the amplifier for tonal signals.

By means of the connections shown, this change in the gain ratio of the amplifier causes a change in the current drawn by the second grids 20d. This current, passing through the resistor 28, causes a potential drop across that resistor which opposes the positive bias of the grids 20d. This change, however, being in the balanced leg of the circuit, follows the fluctuations in the control voltage impressed upon the third grids instead of fluctuating signal voltage impressed by the first grids. The effect of this resistance coupling for the control voltage on the second grids makes the second grids more positive as the third grids become less negative. Consequently, increased absolute potential of the third grids due to increased signal strength causes increased current to the plates, but decreases the current to the second grids. Decreased current to the second grids in turn causes less potential drop through the coupling resistor 28 and thereby increases the positive potential on the second grids. As a result of this increased potential on the second grids, the first grids are caused to exercise increased control of the plate current, thereby further increasing the gain ratio of the amplifier over and above the increase of gain due to the control exercised by the third grids alone.

The details of construction and operation of an expander of this type are more fully set forth and claimed in an application of E. S. Purington, Ser. No. 721,519, now Patent No. 2,096,759 issued October 26th, 1937. It is to be understood, however, that these details may be varied in accordance with the characteristics desired and that a particular type of expander has been shown merely for purposes of illustration.

The use of the expander greatly accentuates the variations in field strength due to changes of altitude. This is illustrated in the curves of Fig.

3 in which curve 47 shows the variation in current intensity through the indicator 13 when a standard amplifying system is used and the curve 48 represents similar variations when the expander of Fig. 1 is used. It will be noted that a given change in altitude produces a much greater change in meter reading when the expander is used which follows the curve 48 than when an amplifier is used which follows the curve 47.

In practice, the scale 18 may be calibrated so that when the plane is flying at a desired altitude the pointer of the indicator 13 will rest in a central position. For example, when the aviator desires to fly at a height of say 1000 ft., he will set the pointer 17 at one-thousand on the scale 18 and will then go up or down until the pointer of the indicator 13 is in a central position. Should the altitude above the ground change either up or down from 1000 ft., the pointer will move either to the left or right, showing this change in altitude and indicating the correction necessary.

It is to be understood that in the event of a discontinuous field, the pointer 11 will fluctuate as the plane passes over the areas of different field strength. The average fluctuation of the pointer may be used, however, as an indication of the field strength. A substantially continuous field of uniform intensity may be obtained at the desired altitude by locating the transmitters on the ground sufficiently close together.

In either case, the present invention provides an extremely sensitive indicator for use on the plane which may be adjusted so as to enable the pilot to accurately maintain any desired altitude.

The invention may also be used as an altimeter by actuating the arm 16 until the indicator 13 assumes a central position. The reading of the scale 18 will then indicate the altitude above the ground.

Although only a few of the various uses of this invention have been set forth, it is to be understood that the invention is not limited to the particular embodiment shown, but may be embodied in various forms and applied to various uses without departing from the scope of the invention. The invention is only to be limited in accordance with the following claims when interpreted in view of the prior art.

I claim:

1. A device for determining distance above a radio trail of the type which varies in field strength according to altitude, which comprises a radiant energy receiver having means to receive radiant energy from said trail and to derive signal current therefrom, volume control means for adjusting the output energy of said receiver, an indicator to indicate the signal strength, an expander network having an input circuit connected to said receiver and an output circuit connected to said indicating device, means responsive to variations in signal strength to change the transmission characteristics of said expander network so as to increase the proportional changes in signal current applied to said indicating device, said volume control means having an index to indicate, in conjunction with said indicating device, the altitude above said trail.

2. A device for determining distance above a radio trail of the type which varies in field strength according to altitude, which comprises a radiant energy receiver having means to receive radiant energy from said trail and to derive signal current therefrom including an indicator connected to indicate the signal strength, volume control means for adjusting the output energy of said receiver so as to cause said indicator to have a given position at the selected altitude, and means responsive to reduction in intensity of the received radiant energy to cause a greater proportional reduction in the signal strength applied to said indicator and means responsive to an increase in intensity of the received radiant energy to cause a greater proportional increase in the signal strength applied to said indicator whereby the response of said indicator is exaggerated to an extent adapted to facilitate the observance of small changes in altitude.

3. The method of determining distance above a radio trail of the type which varies in field strength according to altitude, which comprises receiving radiant energy from said trail, deriving signal current therefrom which is directly proportional to said field strength, expanding the relative changes in said signal current, utilizing the expanded signal to derive an indication of signal strength, adjusting the signal current prior to expansion to produce a predetermined indication, whereby variations in indications show changes in altitude and the adjustment shows absolute altitude.

JOHN HAYS HAMMOND, JR.